United States Patent
Ezzat

(10) Patent No.: US 10,171,606 B2
(45) Date of Patent: Jan. 1, 2019

(54) SYSTEM AND METHOD FOR PROVIDING DATA AS A SERVICE (DAAS) IN REAL-TIME

(71) Applicant: Futurewei Technologies, Inc., Plano, TX (US)

(72) Inventor: Ahmed Kamal Ezzat, Cupertino, CA (US)

(73) Assignee: Futurewei Technologies, Inc., Plano, TX (US)

(*) Notice: Subject to any disclaimer, the term of this patent is extended or adjusted under 35 U.S.C. 154(b) by 685 days.

(21) Appl. No.: 14/839,226

(22) Filed: Aug. 28, 2015

(65) Prior Publication Data

US 2017/0061007 A1    Mar. 2, 2017

(51) Int. Cl.
G06F 17/30 (2006.01)
H04L 29/08 (2006.01)

(52) U.S. Cl.
CPC ........ *H04L 67/28* (2013.01); *G06F 17/30867* (2013.01); *H04L 67/2804* (2013.01); *H04L 67/2838* (2013.01)

(58) Field of Classification Search
None
See application file for complete search history.

(56) References Cited

U.S. PATENT DOCUMENTS

| | | | |
|---|---|---|---|
| 2008/0201381 A1* | 8/2008 | Desai | G06F 17/30 707/200 |
| 2008/0244429 A1* | 10/2008 | Standing | G06F 3/048 715/764 |
| 2013/0275585 A1 | 10/2013 | Santhanakrishnan et al. | |
| 2013/0311454 A1 | 11/2013 | Ezzat | |
| 2014/0129707 A1 | 5/2014 | Baumback et al. | |
| 2015/0127660 A1 | 5/2015 | Zilbergerg et al. | |
| 2015/0227631 A1 | 8/2015 | Legrand et al. | |

FOREIGN PATENT DOCUMENTS

| | | | |
|---|---|---|---|
| CN | 102663021 A | 9/2012 | |
| CN | 102801489 A | 11/2012 | |
| CN | 104618324 A | 5/2015 | |

* cited by examiner

*Primary Examiner* — Belix M Ortiz Ditren
(74) *Attorney, Agent, or Firm* — Slater Matsil, LLP

(57) ABSTRACT

System and method embodiments are provided for implementing Data as a Service (DaaS). The system is implemented using a client side library, on a user device, and a server or proxy server to extract relevant data from relevant data sources, and process the data before returning results to the client. The client sends a user query to the proxy server, which then sends sub-queries and receive responses from multiple data sources in real-time or near real-time. The system also uses a data model that handles varying data reliability or accuracy levels in heterogeneous data sources and indicates the confidence levels in the data provided to a user or client application. The data model assigns different confidence levels for various data to distinguish between high quality data and low quality data. Thus, users are provided with more information from multiple sources without diluting high quality data with low quality data.

21 Claims, 4 Drawing Sheets

SYSTEM AND METHOD FOR PROVIDING DATA AS A SERVICE (DAAS) IN REAL-TIME

TECHNICAL FIELD

The present invention relates to networking and data query, and, in particular embodiments, to a system and method for providing Data as a Service (DaaS) in real-time.

BACKGROUND

In communications systems and networks, data can be exchanged to perform functions and services, to be processed in a desired manner, and/or to request information. For example, users of mobile devices (e.g., smartphones) or other user equipment (UEs) request and process data to run applications on their devices or to display the data in some form that conveys information to the users. For example, the requested data can be viewed in web browsing applications, emails, maps, weather applications, or any other suitable form according to user needs. Networks such as the Internet provide access to a reservoir of information to users around the globe. The users may access data via any suitable and available network services and equipment.

A user may request data from multiple sources to obtain information of some content or topic. However, the quality and reliability of the data may vary depending on the sources. Assimilating and filtering through such data in a manner that improves the reliability and increase the amount or value of information is beneficial to users and provides better quality of service. Benefit is further added when the information is provided in real-time. This is the case when users request data on UEs using available network connection rates and expect practically instant or short delay responses. Thus, there is a need for a scheme that can obtain requested data from multiple sources of variable reliability and process the data to present, in real-time, information to users.

SUMMARY OF THE INVENTION

In accordance with an embodiment, a method for providing data as a service (DaaS) in near or real-time includes receiving, at a proxy server, a query from a client application, and requesting, by the proxy server from a plurality of data sources, data to service the query. The data sources are heterogeneous in term of data quality, or data structure, or both data quality and data structure. The method further includes obtaining the data from each data source in near or real-time, assigning a confidence level to the data from each data source in accordance with reliability of the data source, and joining the data including the confidence level from the data sources. The joined data is sent back to the client application.

In accordance with another embodiment, a method for providing DaaS in near or real-time includes sending, by a client application on a user device a query to a proxy server, and receiving from the proxy server, in near or real-time, a joined response from a plurality of data sources. The joined response includes responses from the data sources with confidence levels associated with the responses in accordance with reliability of the corresponding data sources.

In accordance with another embodiment, a network server for providing DaaS in near or real-time includes a processor and a non-transitory computer readable storage medium storing programming for execution by the processor. The programming includes instructions to receive a query from a client application, and request, from a plurality of data sources, data to service the query. The data sources are heterogeneous in term of data quality or data structure. The programming includes further instructions to obtain the data from each data source in near or real-time, assign a confidence level to the data from each data source in accordance with reliability of the data source, join the data including the confidence level from the data sources, and send the joined data to the client application.

In accordance with yet another embodiment, a user device for providing DaaS in near or real-time includes a processor and a non-transitory computer readable storage medium storing programming for execution by the processor. The programming includes instructions to send to a server proxy a query and receive from the server proxy, in near or real-time, a joined response from a plurality of data sources. The joined response includes responses from the data sources with confidence levels associated with the responses in accordance with reliability of the corresponding data sources.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

System and method embodiments are provided for implementing Data as a Service (DaaS). The systems can be implemented using a client side library and a proxy server to extract relevant data from relevant data sources, and process the data before returning the results back to the client. The client side library can use an application programming interface (API) to send a user query to a server or proxy server. The proxy server is configured to send sub-queries and receive responses for the sub-queries from multiple data sources (e.g., databases) in real-time or near real-time. The data can be obtained from the data sources in real-time without integrating and storing the data at a data warehouse (DW) separate from the data sources and the requesting device. Near real-time response can be achieved by querying the data sources rather than copying the data from the sources to a DW and then querying the DW. The data sources can be heterogeneous in terms of reliability, content format, type, or other features. The reliability of the data represents the data accuracy and/or the confidence in the reliability of the data source.

The embodiments also include a data model that handles the variable data reliability/quality/accuracy levels in the heterogeneous data sources and determines the confidence levels in the provided data to a user or client application. The data model is configured to assign different confidence levels for various data, thereby distinguishing between and presenting high quality data and low quality data to users. In an embodiment, the data model represents each data value by the 3-attributes <key, value, probability>, where the key filed is used to identify the data, and the probability field indicates a confidence level in the data or source. The confidence level depends on the reliability of the source. High quality data reflects high confidence in the source, while low quality data reflects low confidence in the source. The probability field can be represented as a percentage, as a value that scores the confidence level (e.g., between 0 and 1), or any other indicator of the confidence in the source or the data quality/reliability. Since varying quality data is also considered in the data model, the information made available to users by this system is increased without diluting the high quality data with low quality data.

Figure 1:
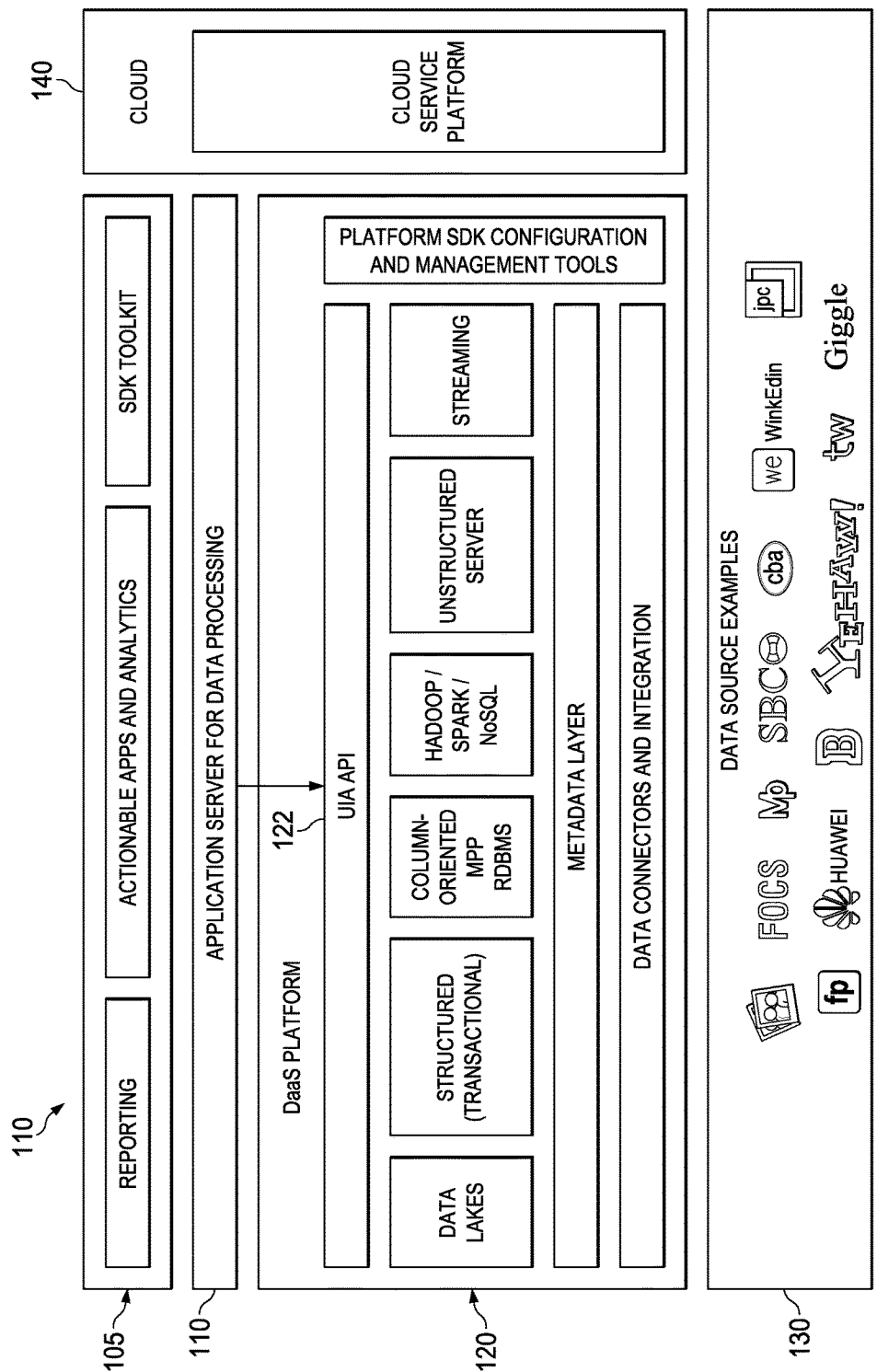
FIG. 1 illustrates an embodiment of a system for providing Data as a Service (DaaS) in real-time.

FIG. 1 shows an embodiment of a system 100 including various components for providing DaaS in real-time. A DaaS platform 120 serves as an interface between a plurality of data sources 130 and an application server 110 for data processing. The application server 110 receives queries for data from client applications 105 and responds with the data. The client application 105 can run on a UE or any other user device that communicates with the DasS platform 120. As used herein, the term user device includes any device operated by a user or other devices such as machine-to-machine (M2M) devices and sensor devices. The DaaS platform 120 sends the queries to and receives in response the data from various (heterogeneous) data sources. Examples of data sources include network services such Wikipedia™, Google™, Facebook™, Twitter™, The Weather Channel™, Linked In™, You Tube™, or other online data services. Further examples of data sources are shown in FIG. 1. The application layer 105, the application server 110 and the DasS platform are software components that can be implemented at least partially using a cloud service platform 140, e.g., on a UE and one or more servers accessible by the Internet.

The DaaS server 110 includes an API 122 for handling a query with multiple data sources. The API 122 sends the query from a client application (e.g., on a UE) to multiple data sources and integrates the information received from the sources to respond with data back to the user. A single API 122, referred to herein as Unified Information Access (UIA) API, serves as a single client API used to connect to the proxy server over a network passing the user query, forward the query to and receive information from multiple heterogeneous data sources, and return the information back to the client. To handle the queries for the client, the UIA API 122 can interact with multiple engines (e.g., servers) or services (e.g., in the cloud) that requests the various data formats from heterogeneous sources and forwards the corresponding data to the API 122. The UIA API 122 can send sub-queries to the engines in the native language of the data sources to request the data. Examples of such engines/services include data lakes, structured (transactional) data servers, column oriented massively parallel processing (MPP) relational database management systems (RDBMS), unstructured data servers, streaming services, engines such as HADOOP, Spark, NoSQL, or others. The engines/services can interact with the various data sources to obtain the data using a metadata layer, data connectors and integration. The components of the application layer 105 and the DaaS platform 120 can be developed and configured by software developers using software development kits (SDKs).

Figure 2:
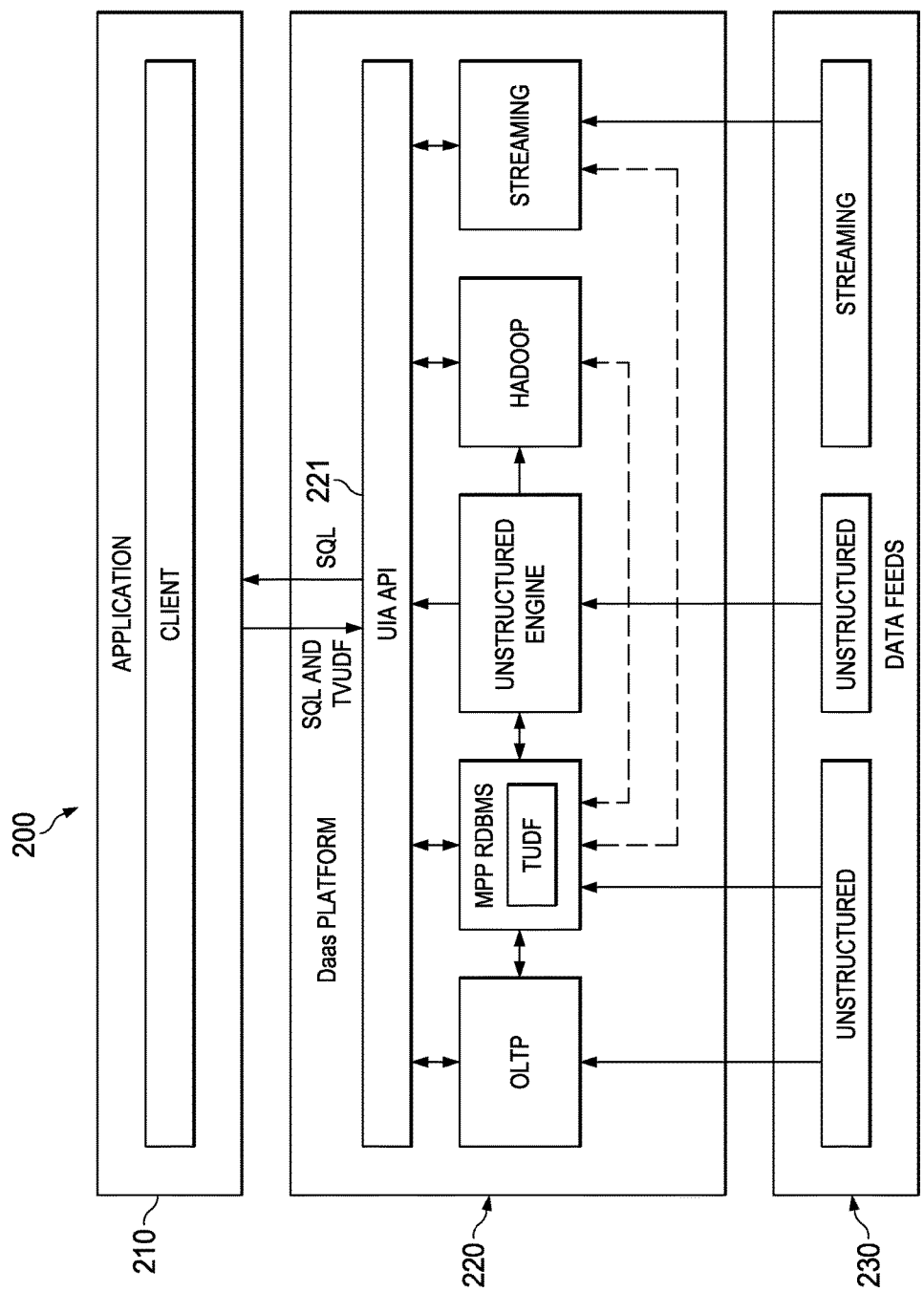
FIG. 2 illustrates another embodiment of a system for providing DaaS in real-time.

FIG. 2 shows another embodiment of a system 200 including various components for providing DaaS in real-time. A DaaS platform 220 serves as an interface between a client application 210 (e.g., at a UE) and a plurality of feeds 230 belonging to heterogeneous data sources. The data sources provide data of different formats to the DaaS platform 220 in response to a query from the client application 210. The DaaS platform 220 includes a UIA API 221 that operates as an interface between the client application 210 and various engines that handle the different data feeds 230. Examples of such engines include online transaction processing (OLTP) servers and MPP RDBMS for handling structured data, unstructured data engines for handling unstructured data, and streaming services for handling streamed data. The DaaS platform 220 may also include services, such as Hadoop MPP RDBMS and streaming services, that exchange (send/receive) data between each other in response to queries from the UIA API 221.

In the systems above, the client application can access data relevant to the user query, from multiple data sources, using the native query language of each queried data source. The user query can be written in SQL and leverage Table-Valued User Defined Functions (TVUDFs). A SQL engine can be used as the proxy server to coordinate executing a different TVUDF for each of the relevant data sources, get the results back from the data sources and translate each into a temporary/virtual table, and then perform a JOIN operation between the relevant base tables and the virtual tables and return the results in a standard SQL data type format. The TVUDF allows mapping the result returned from a given data source in the SQL engine into a virtual table. The virtual tables, which represent the output of TVUDFs, are deleted automatically by the SQL engine at the end of the client query execution. Deleting the virtual tables prevents unnecessary increase of storage size for processing the queries and data. An example of a query process can be in the following form:

| | |
|---|---|
| SELECT | x, y, ... , z |
| FROM T1, | TVUDF1(...) AS T2, |
| | TVUDF2(...) AS T3, |
| | TVUDF3(...) AS T4 |
| WHERE | predicate1 and |
| | predicate2 and |
| | (conf(x) > 0.9 and conf(y) > 0.8); |

The TVUDF takes a string representing the native query to a specific external data source and returns a virtual table to be used in computing the client result to the above query.

The systems above allow query responses from different data sources to have different data quality or reliability with various degrees of confidence, as described above. This can be achieved using a probabilistic data model which includes a probability value that serves as a confidence indicator in the data according to the reliability or accuracy of the source. Thus, the high quality data responses to the query can be combined but are not convoluted with the low quality responses. By including data of different quality in the response to a query, the information value is increased.

Figure 3:
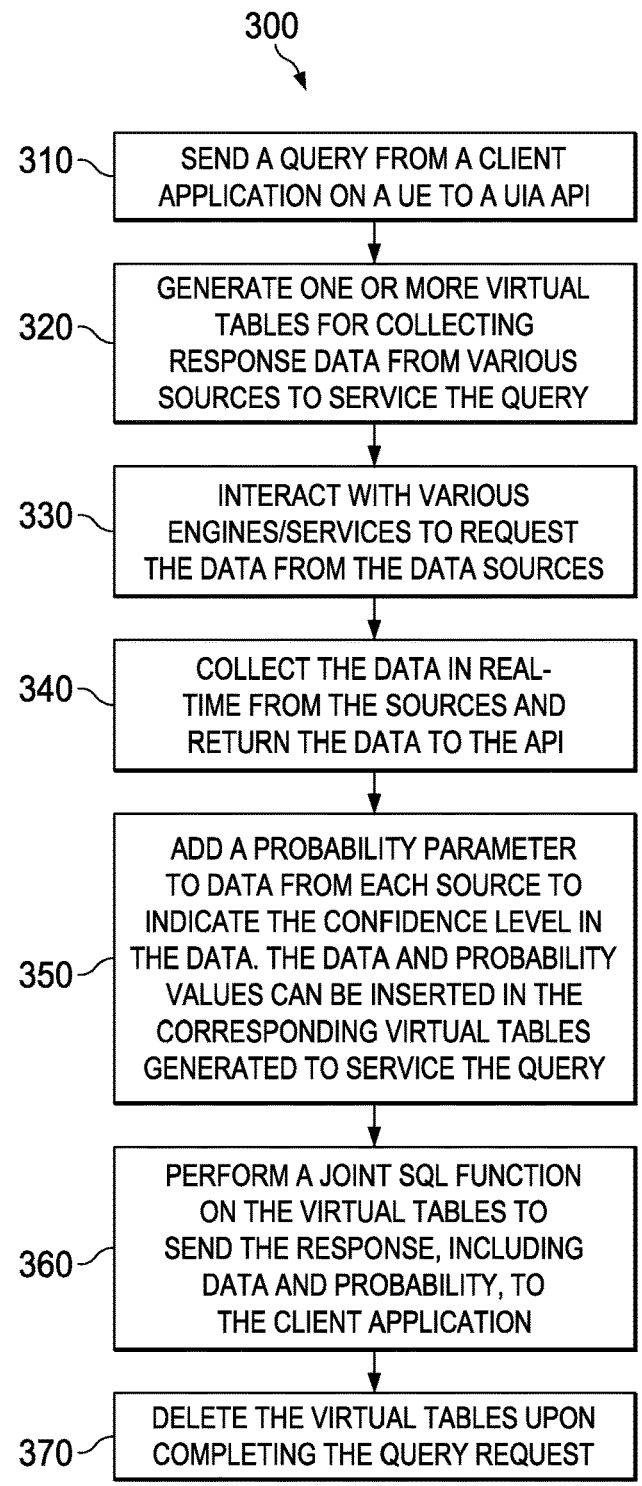
FIG. 3 illustrates an embodiment method for implementing DaaS in real-time.

FIG. 3 is a flowchart of an embodiment method 300 for implementing DaaS in real-time. For instance, the method can be implemented by the system 100 or 200. At step 310, a client application on a UE sends a query for data to a proxy server or UIA API, e.g., in the cloud. The client application is any application that requests information. For example, the client application can be an app on a mobile device operated by a user. The query can be sent in SQL and using the TVUDF and may indicate a desired data quality or reliability of response. At step 320, the UIA API generates one or more virtual tables for collecting response data from various sources to service the query. The virtual tables can be temporarily stored at a DW or any suitable data repository. At step 330, the UIA API interacts with various engines/services to request the data from the data sources, which are connected to the cloud for example. At step 340, the engines/services (in the DaaS platform) collect the data in real-time from the sources and return the data to the UIA API. At step 350, the UIA API adds a probability parameter to data from each source to indicate the confidence level in the data. The data and probability values can be inserted in the corresponding virtual tables generated to service the query. Alternatively, a probability or confidence indicator can be provided with the data from the sources or the engines/services collecting the data. At step 360, a joint SQL function is performed on the virtual tables to send the response, including data and probability, to the client application. The response may include responses from one or more data sources with corresponding confidence levels that meet the desired quality of response by the client application. In absence of an indication for quality of response by the client application, the joined response includes responses with varying confidence levels from all considered data sources with varying reliability of data. After receiving the response to the query, the user may select the relevant data. At step 370, the virtual tables are deleted upon completing the query request. The method 300 can be performed without persistent storage of data at a DW. However, the data can be temporarily stored, e.g., in virtual tables, at a DW or any suitable storage mechanism for real-time processing.

Figure 4:
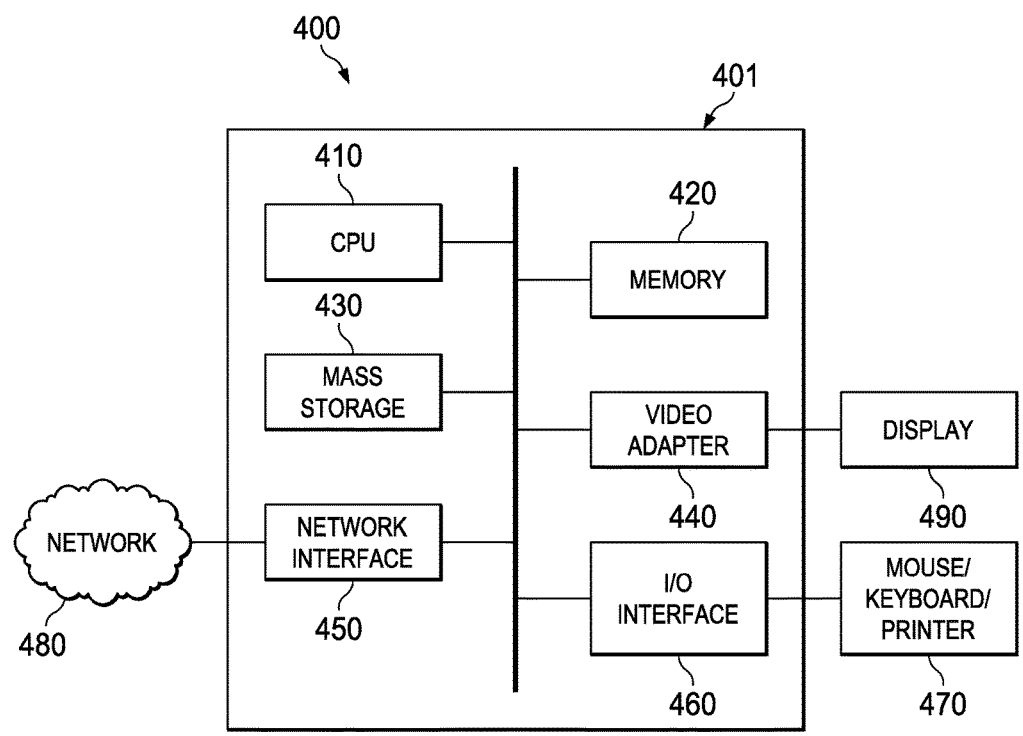
FIG. 4 is a diagram of a processing system that can be used to implement various embodiments.

FIG. 4 is a block diagram of a processing system 400 that can be used to implement various embodiments. The processing system 400 can be part of a wireless communications terminal/device such as a user equipment (UE), e.g., a smart phone, tablet computer, a laptop, or a desktop computer. The system can also be part of a network entity or component that communicates with the terminal, such as a server in the cloud or any suitable network connected to the terminal and data sources. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system 400 may comprise a processing unit 401 equipped with one or more input/output devices, such as a speaker, microphone, mouse, touchscreen, keypad, keyboard, printer, display, and the like. The processing unit 401 may include a central processing unit (CPU) 410, a memory 420, a mass storage device 430, a video adapter 440, and an I/O interface 460 connected to a bus. The bus may be one or more of any type of several bus architectures including a memory bus or memory controller, a peripheral bus, a video bus, or the like.

The CPU 410 may comprise any type of electronic data processor. The memory 420 may comprise any type of system memory such as static random access memory (SRAM), dynamic random access memory (DRAM), synchronous DRAM (SDRAM), read-only memory (ROM), a combination thereof, or the like. In an embodiment, the memory 420 may include ROM for use at boot-up, and DRAM for program and data storage for use while executing programs. In embodiments, the memory 420 is non-transitory. The mass storage device 430 may comprise any type of storage device configured to store data, programs, and other information and to make the data, programs, and other information accessible via the bus. The mass storage device 430 may comprise, for example, one or more of a solid state drive, hard disk drive, a magnetic disk drive, an optical disk drive, or the like.

The video adapter 440 and the I/O interface 460 provide interfaces to couple external input and output devices to the processing unit. As illustrated, examples of input and output devices include a display 490 coupled to the video adapter 440 and any combination of mouse/keyboard/printer 470 coupled to the I/O interface 460. Other devices may be coupled to the processing unit 401, and additional or fewer interface cards may be utilized. For example, a serial interface card (not shown) may be used to provide a serial interface for a printer.

The processing unit 401 also includes one or more network interfaces 450, which may comprise wired links, such as an Ethernet cable or the like, and/or wireless links to access nodes or one or more networks 480. The network interface 450 allows the processing unit 401 to communicate with remote units via the networks 480. For example, the network interface 450 may provide wireless communication via one or more transmitters/transmit antennas and one or more receivers/receive antennas. In an embodiment, the processing unit 401 is coupled to a local-area network or a wide-area network for data processing and communications with remote devices, such as other processing units, the Internet, remote storage facilities, or the like.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for providing data as a service (DaaS) in near or real-time comprising:
   receiving, at a proxy server, a query from a client application;
   requesting, by the proxy server from a plurality of data sources, data to service the query, wherein the data sources are heterogeneous in terms of data quality, or data structure, or both data quality and data structure;
   obtaining, in response to the request by the proxy server from the plurality of data sources for data to service the query, received data from each data source of the plurality of data sources in near or real-time;
   assigning respective confidence levels to the received data from each data source in accordance with reliability of the data source;
   collecting the received data from the data sources and the respective confidence levels into virtual tables using Table Valued User Defined Functions (TVUDFs) embedded in the query;
   joining the received data including the respective confidence levels from the data sources to generate joined data, the joined data comprising the received data from each of the data sources and the respective confidence levels of the received data from each of the data sources; and
   sending the joined data to the client application.

2. The method of claim 1, wherein:
   joining the received data including the respective confidence levels from the data sources to generate joined data comprises joining the virtual tables; and
   the method further comprises deleting the virtual tables created by executing the TVUDFs upon completing execution of the query.

3. The method of claim 1, wherein the query is received as a Structured Query Language (SQL) query with a TVUDF.

4. The method of claim 1, wherein the data of the joined data is in a three-attribute form, including a key identifying the data, a value of the data, and a probability value indicating the confidence level.

5. The method of claim 1, wherein the received data is obtained and sent to the client application without persistent storage by the proxy server of the received data at a data warehouse.

6. The method of claim 1, wherein the data is requested from the data sources via a plurality of corresponding data engines for handling the data quality or data structure of the data sources in real-time.

7. The method of claim 6, wherein at least some of the data engines exchange between each other at least some of the data to service the request.

8. The method of claim 1 further comprising:
   forwarding the query in native query language of each data source to a plurality of data engines corresponding to the data sources; and
   obtaining, in near or real-time, by the data engines from the data sources, the received data in response to the query, wherein the received data is joined at the proxy server.

9. The method of claim 8, wherein:
   the proxy server is implemented in a cloud based computing platform; and
   the client application is implemented on a user device.

10. A method for providing data as a service (DaaS) in near or real-time comprising:
    sending, by a client application on a user device, a query to a proxy server; and
    receiving, from the proxy server in near or real-time, a joined response, the joined response comprising:
       data received by the proxy server from a plurality of data sources of which the proxy server requested data to service the query, the plurality of data sources being heterogeneous in terms of data quality, or data structure, or both data quality and data structure; and
       respective confidence levels associated with the data in accordance with a reliability of the data source from which the data was received:
    wherein the joined response is in a three-attribute form, including a key identifying the data, a value of the data, and a probability value indicating the confidence level of the data source from which the data was received by the proxy server.

11. The method of claim 10, wherein:
    the query sent by the client application to the proxy server comprises an indication of a desired quality of response; and
    the joined response received from the proxy server has been filtered to exclude data for which the associated confidence level is not in accordance with the desired quality of response.

12. The method of claim 10, wherein the joined response includes data having varying associated confidence levels from data sources with varying reliability of data.

13. The method of claim 10, wherein the query is sent using Structured Query Language (SQL) query and a table value user defined function (TVUDF).

14. The method of claim 10, wherein the data is obtained and returned to the client application without persistent storage of the data at a data warehouse.

15. A network server for providing data as a service (DaaS) in near or real-time, the network server comprising:
    a processor; and
    a non-transitory computer-readable storage medium storing programming for execution by the processor, the programming including instructions to:
       receive a query from a client application;
       request, from a plurality of data sources, data to service the query, wherein the data sources are heterogeneous in terms of data quality, or data structure, or both data quality and data structure;
       obtain, in response to the request by the proxy server from the plurality of data sources for data to service the query, received data from each data source of the plurality of data sources in near or real-time;
       assign respective confidence levels to the received data from each data source in accordance with reliability of the data source;
       collect the received data from the data sources and the respective confidence levels into virtual tables using Table Valued User Defined Functions (TVUDFs) embedded in the query;
       join the received data including the respective confidence levels from the data sources to generate joined data, the joined data comprising the received data from each of the data sources and the respective confidence levels of the received data from each of the data sources; and
       send the joined data to the client application.

16. The network server of claim 15, wherein:

joining the received data including the respective confidence levels from the data sources to generate joined data comprises joining the virtual tables; and the programming includes further instructions to delete the virtual tables created by executing the TVUDFs upon completing execution of the query.

17. The network server of claim 15, wherein the programming includes further instructions to:

forward, to a plurality of data engines corresponding to a plurality of data sources, the query in native query language of each data source; and obtain, in near or real-time, by the data engines of the data sources, the received data in response to the query, wherein the data engines handle the data structure of the corresponding data sources in real-time.

18. The network server of claim 15, wherein the client application runs on a user device, and wherein the network server communicates with the user device through a cloud based computing platform.

19. A user device for providing data as a service (DaaS) in near or real-time, the user device comprising:

a processor; and a non-transitory computer-readable storage medium storing programming for execution by the processor, the programming including instructions to:

send to a proxy server a query; and receive, from the proxy server in near or real-time, a joined response, the joined response comprising:

data received by the proxy server from a plurality of data sources of which the proxy server requested data to service the query, the plurality of data sources being heterogeneous in terms of data quality, or data structure, or both data quality and data structure; and respective confidence levels associated with the data in accordance with a reliability of the data source from which the data was received;

wherein the joined response is in a three-attribute form, including a key identifying the data, a value of the data, and a probability value indicating the confidence level of the data source from which the data was received by the proxy server.

20. The user device of claim 19, wherein:

the query sent by the client application to the proxy server comprises an indication of a desired quality of response; and the joined response received from the proxy server has been filtered to exclude data for which the associated confidence level is not in accordance with the desired quality of response.

21. The user device of claim 19, wherein the joined response comprises data having varying associated confidence levels from data sources with varying reliability of data.

* * * * *